Patented May 23, 1944

2,349,585

UNITED STATES PATENT OFFICE 2,349,585

FOAM PREVENTION

Donald C. Bond, Northbrook, and Charles W. Botsford, Niles Center, Ill., assignors to The Pure Oil Company, Chicago, Ill., a corporation of Ohio No Drawing. Application July 8, 1940, Serial No. 344,372

14 Claims. (Cl. 252—8.5)

This invention relates to anti-foaming agents and is more particularly concerned with the prevention of foaming or gas-cutting of aqueous colloidal dispersions of mineral particles of the clay type such as bentonite.

It is an object of this invention to facilitate release of occluded gases from liquids.

It is a further object of this invention to provide a method of preventing gas cutting of aqueous colloidal positively charged dispersions of mineral particles.

It is another object of this invention to provide an improved method of drilling earth bore holes with the aid of a mud fluid circulated around the drill and through the bore hole.

It is still another object of this invention to provide an improved well drilling fluid.

Still another object is to provide a method of preventing foaming of drilling muds containing basic dye and colloidally dispersed positively charged mineral particles of the clay type.

In drilling wells such as those drilled to produce oil and gas, by reciprocating or rotary methods, it is customary to circulate a fluid through the well and around the drill during drilling operations. The use of a fluid is particularly desirable in rotary drilling. While the fluid circulated may be plain water, aqueous suspensions of solid mineral matter such as clay, bentonite, etc., are more frequently used. These suspensions, or muds, as they are generally called, have several well-recognized functions. They serve to lubricate and cool the drill, to deposit solids or gelatinous matter on the bore hole wall, filling crevices and pores and thus preventing loss of fluid into the formation adjoining the bore, and to carry drill cuttings and sand to the surface for removal.

Another function of drilling muds is the prevention of escape of gas from the well. Many formations through which the drill passes are associated with gas formations, and gas tends to enter the well under pressures which are frequently very high. When the bore hole is filled with fluid, the column of fluid exerts a hydrostatic pressure in the well, the pressure corresponding to the density of the fluid, and the height of the column of fluid in the well. At a given depth, the greater the density of the mud used, the greater the hydrostatic head will be.

It is principally for this reason that muds rather than plain water are used as drilling fluids since the densities of the muds are generally much greater than water. For best results, the density of the mud should be as high as possible consistent with a high degree of fluidity which is necessary to facilitate pumping of the mud and flow through the well. In many cases the mud comprises a substantial proportion of a weighting material such as barytes, iron oxide, or other finely-divided heavy solids in order to secure the desired density.

When the drill penetrates a stratum containing gas under high pressure, the drilling fluid dissolves more or less gas. As the fluid travels upward in the bore toward the surface under pump action, pressure in the fluid column gradually drops, and the dissolved gas is released, forming bubbles permeating the fluid. This contamination of the mud with gas is called "gas-cutting" and is undesirable because it results in a lower effective density of the mud. When gas-cutting occurs even to only a slight extent, it is essential that the gas bubbles be released as quickly and completely as possible when the mud fluid reaches the surface and before the fluid is returned to the bore in order that the mud may not become further gas-cut during the next cycle through the bore. Unless gas is removed when the mud is at the surface, the gas-cutting is aggravated in each recycling of the mud and may proceed to a degree where the pressure exerted by the gas in the gas-bearing stratum exceeds the pressure due to the hydrostatic head of the column of gas-cut mud above the stratum. The result may be and often is a "blow-out." This is a forcible ejection of mud from the well by means of high gas pressure prevalent in the well. This may result in serious fires if the gas becomes ignited, and the derrick and pumping equipment may be damaged or destroyed by the escaping gas or by rocks and sand blown from the well.

It has now been discovered that release of gas from liquids and more particularly from aqueous dispersions of positively charged mineral matter is greatly facilitated if the dispersions are treated with small amounts of certain neutral, water-soluble organic substances of the class known as "esters." The esters referred to are true esters, that is, compounds formed by the reaction of mono- or polyhydric alcohols and organic acids with the elimination of water.

The particular esters with which this invention is concerned are those esters of the higher molecular weight fatty acids such as those fatty acids containing 12 to 18 carbon atoms, or more, in the molecule. Examples of suitable fatty acids include lauric, myristic, palmitic, oleic, stearic, ricinoleic, and linoleic acids. Alcohols suitable for reaction with these acids include ethyl, butyl, amyl, iso-amyl, glycerol and glycol. Among the specific compounds which have been found suitable are diglycol laurate, diglycol oleate, glyceryl mono-ricinoleate and iso-amyl stearate. While all of the compounds referred to presumably reduce the surface tension of the water in the mud, it has been found that the reduction of surface tension is not a satisfactory criterion as to the utility of the compounds for preventing gas-cutting of positively charged colloidal drilling muds, particularly those positively charged colloidal muds containing basic dye. With the small amounts of additives contemplated, the general characteristics of the mud, such as viscosity, density, degree of deflocculation, etc., remain essentially unchanged. An amount of the foregoing esters equal to 0.05% to 2% by weight of the mud is sufficient to substantially eliminate gas-cutting tendencies, and in most cases excellent results have been obtained when using between approximately 0.05% and 1%. Complete elimination of gas-cutting is neither necessary nor desirable since the amount of ester required to effect this result is beyond that which is generally considered economical.

The extent of gas-cutting is conveniently described or evaluated quantitatively as the difference in density of the fluid before and after gas-cutting has taken place.

For example, a normal mud fluid may have a specific gravity of 1.5 and the density may be reduced to 1.2, or even lower after gas-cutting by reason of the gas bubbles dispersed through the fluid.

In order to show the extent of gas-cutting to be expected with ordinary muds containing positively charged colloidally dispersed mineral particles, compared with the same drilling muds containing small quantities of additives within the scope of this invention, muds containing colloidally dispersed, positively charged bentonite and basic dye were prepared containing varying quantities of additives intended to serve as foam preventatives. The drilling mud used for these tests consisted of 95% water, 3.33% methyl violet and 1.67% bentonite. The bentonite was colloidally dispersed and without the basic dye, would have carried a negative charge. The methyl violet was used to impart a positive charge to the bentonite. 100 grams of this mixture was weighed into an eight-ounce bottle and 75 grams of Baroid weighting agent added to and dispersed in the mixture. The calculated specific gravity of this mud was 1.53. The desired amount of additive was then added, and the entire mixture vigorously shaken for five minutes, at the end of which time a 25 cc. pycnometer was immediately filled from the eight-ounce bottle. The degree of gas-cutting of the samples is indicated by the specific gravity, the higher the degree of gas-cutting, the lower the specific gravity. The bottles were filled with methane prior to introduction of the mud in order to approximate as closely as possible the conditions most likely to be encountered in actual drilling operations. The surface tension of water containing 0.1% by volume of additive was also determined in an effort to establish a correlation between the surface tension reducing properties of the additives and efficacy for reducing gas-cutting. The results of these tests are shown in the table:

Table

| Additive | Cc. additive per 100 g. of dye-bentonite mud | Specific gravity of mixture | Surface tension of 0.1% water solution of additive (dynes/cm.) 77° F. |
|---|---|---|---|
| Ethyl acetate | 0.1<br>0.2<br>0.5<br>1.0<br>2.0 | 0.93<br>1.06<br>1.02<br>1.16<br>1.17 | 66.0 |
| Diglycol laurate | 0.1<br>0.2<br>0.5 | 1.26<br>1.34<br>1.43 | 34.5 |
| Diglycol oleate | 0.25<br>0.50<br>1.00 | 1.34<br>1.35<br>1.35 | 40.2 |
| Glyceryl monoricinoleate | 0.1<br>0.2<br>0.35<br>0.5 | 1.26<br>1.40<br>1.46<br>1.48 | 37.9 |
| Iso-amyl stearate | 0.05<br>0.10<br>0.15<br>0.20 | 1.04<br>1.35<br>1.47<br>1.51 | 61.9 |
| n-Octyl alcohol | 0.4<br>0.8<br>1.2<br>2.0 | 1.18<br>1.17<br>1.14<br>1.22 | 42.3 |
| Tri-iso-amylamine | 0.2<br>0.5<br>1.0<br>2.0 | 0.98<br>1.06<br>1.12<br>1.19 | 46.3 |
| None | 0 | 0.86 | |
| Water | | | 72.0 |

It will be noted from the foregoing results that while all of the additives incorporated into the drilling mud compositions possessed the ability of reducing the surface tension of water, yet the efficacy of the additives for preventing gas-cutting of the mud compositions does not bear any direct relation to the surface tension reducing properties. Note, for example, that although n-octyl alcohol and tri-isoamylamine were among the best surface tension reducing materials, these materials were among the poorest materials for preventing the gas-cutting of the mud composition even when added in quantities as high as 2%. Furthermore, the tri-isoamylamine due to its basic properties was entirely unsatisfactory as an additive due to the fact that it flocculated the mud to which it was added. It will be further noted that although the surface tension reducing property of diglycol laurate was the most effective of any of the additives used, yet this material was not nearly as effective as iso-amyl stearate for reducing gas-cutting of the mud. The results obtained when using ethyl acetate (an ester of a low molecular weight fatty acid) as an additive clearly indicate that while this material has a slight beneficial effect in the reduction of gas-cutting of mud, yet it is greatly inferior to the esters of the higher molecular weight fatty acids. The surface tension measurements shown in the table were determined by the well-known "drop-weight" method.

It will be seen from the data in the table that mono- and polyhydric alcohol esters of the higher molecular weight fatty acids have unique properties in preventing the gas-cutting of drilling muds in which the colloidally dispersed mineral particles are positively charged. By applying materials within the scope of this invention to such drilling muds, gas-cutting may be reduced to a low degree, and the dangers attending the use of gas-cut drilling muds substantially eliminated. The use of mechanical separating devices or of settling pools of unusually large volume may be eliminated.

It is not desired that the invention shall be limited to any of the specific examples which have been given merely for the sake of illustration, nor to any particular theory of operation, but is to be construed as broadly as possible in view of the following claims.

We claim:

1. In a method of drilling wells wherein a positive colloid mud fluid comprising basic dye and positively charged mineral particles is circulated in the well bore, the step which comprises adding a modicum of neutral ester of high molecular weight fatty acid to the fluid.

2. The step in accordance with claim 1 in which the fatty acid radical in the ester contains approximately 12 to 18 carbon atoms.

3. The step in accordance with claim 1 in which the ester is iso-amyl stearate and the quantity added is between approximately 0.05% and 2%.

4. The method of facilitating the release of gas from aqueous dispersions of positively charged colloidal mineral particles containing basic dye comprising adding to the dispersions a modicum of neutral ester of high molecular weight fatty acid.

5. Method in accordance with claim 4 in which the ester is added in the amount of approximately 0.05% to 2%.

6. Method in accordance with claim 4 in which fatty acid radical in the ester contains approximately 12 to 18 carbon atoms and the alcohol radical is obtained from monohydric aliphatic alcohol.

7. Method in accordance with claim 4 in which the ester is iso-amyl stearate.

8. An improved well drilling fluid comprising an aqueous dispersion containing basic dye and positively charged colloidal mineral particles and a modicum of neutral ester of high molecular weight fatty acid.

9. A fluid in accordance with claim 8 in which the fatty acid radical in the ester contains approximately 12 to 18 carbon atoms and the alcohol radical is obtained from a monohydric aliphatic alcohol.

10. A fluid in accordance with claim 8 in which the ester is an ester of stearic acid.

11. A fluid in accordance with claim 8 in which the ester is iso-amyl stearate and the amount added is approximately 0.1% to 1%.

12. An improved well drilling fluid comprising an aqueous dispersion containing positively charged bentonite particles and methyl violet and iso-amyl stearate.

13. Method in accordance with claim 1 in which the ester is diglycol laurate.

14. A well drilling fluid in accordance with claim 8 in which the ester is diglycol laurate.

DONALD C. BOND.
CHARLES W. BOTSFORD.